Jan. 23, 1968   L. CAHN   3,365,350
THREE DIMENSIONAL PICTURE
Filed April 28, 1965   2 Sheets-Sheet 1

INVENTOR.
LEO CAHN
BY Edward Halle
ATTORNEY.

INVENTOR.
LEO CAHN
ATTORNEY.

3,365,350
THREE DIMENSIONAL PICTURE
Leo Cahn, 30 Salem Way,
Glen Head, N.Y. 11545
Continuation-in-part of abandoned application Ser. No. 370,009, May 25, 1964. This application Apr. 28, 1965, Ser. No. 451,537
13 Claims. (Cl. 161—33)

ABSTRACT OF THE DISCLOSURE

This invention is concerned with various forms of three dimensional pictures and changeable pictures in which the three dimensional and changeable effect is created by the use of two different views made up in alternate striations which are placed on curved reflecting mirrors without the use of lenticular or other types of lenses.

---

This application is a continuation in part application of my prior filed application for Three Dimensional Picture, filed May 25, 1964, Ser. No. 370,009, now abandoned.

The present invention pertains to the art of producing a three dimensional picture, in particular a picture which has the appearance of depth without the help of any special auxiliary viewing device. Such pictures, produced by any of the known printing methods, have been known for decades. They consist of generally opaque or transparent sheets of paper, paper board, plastic material, etc. with an imprint in black and white or color, laminated to a lenticular face plate of transparent material; or they are made of a transparent plastic carrier sheet, printed on the back of same, to be viewed through the face of said plastic sheet which has on its face a lenticular system. The imprint is basically made of two pictures which are combined in alternate striations. The vertical line elements or striae of one picture are alternated with similar line elements or striae of the second picture, forming a vertical grid of parallel lines in striation. One of the pictures consists of a right-eye view of an object, and the other picture a left-eye view of the same object in normal visual parallax. Since the face plate carries on its surface a vertical fluting, which forms the aforementioned vertical lenticular system, we obtain an optical effect. I define "vertical" to mean perpendicular lines of a picture held up facing the eyes. "Horizontal" means an imaginary line drawn through the two pupils of the eyes of the viewer at right angles to the aforementioned vertical lines. The "fluting" is made up of vertical parallel ridges which have a near-parabolic or circular smooth surface creating a multi-lenticular system of convex lenses. These convex lenses have a plane side formed at the rear of the flat sheet of the plastic plate. These plane convex lenses give us the desired optical effect which is to divert light rays from the striae making up the right-eye elements of the picture into the right eye, and in the same way, the left-eye elements of the picture into the left eye of the viewer, thereby creating the illusion of three-dimensional vision in the viewer's mind.

Most of the incoming light rays that hit the picture after passing through the plastic face plate are reflected and some are absorbed. On their way back from the picture through the lenticular system, some rays are deflected completely and become ineffective, but a certain percentage of these rays will exit through the lenticular system and will be deflected through the focus of each lens to the proper eye. The left-eye and right-eye pictures become separated because each lens of the system is arranged in such a way that its location covers as exactly as possible a pair of alternate left-eye and right-eye picture elements. The light rays coming from the right-eye element of the picture are focused into the right eye of the viewer. Similarly, the left-eye pictorial element will send a ray through the focus of the lenticular system into the left eye of the viewer. The sum of all these light rays, or beams, will create the illusion of a three-dimensional picture.

There is an obvious relationship between the width of the right-eye and left-eye pictorial elements or striae and the thickness of the lenticular plate, i.e. a certain thickness is required to properly project the light beams into the viewer's eyes. The thickness of the plate should be at least two to three times the chord of the lens. This puts certain restrictions and limitations on the lenticular system to be used. For example, in larger pictures, the striae are wider and the depth of the lenticular plate is greater until it reaches a size which is bulky, inconvenient and unwieldy.

My present invention departs essentially from the aforementioned method by using a different optical system, the advantage of which will become clear in the following description. Instead of using a series of convex lenses spaced at a certain distance from the pictorial surface elements, a series of concave mirrors, or convex mirrors, or a series of alternating concave and convex mirrors, located behind the pictorial elements are used. The separation of right-eye and left-eye light beams is accomplished by the optical effect of the mirrors located behind the pictorial elements.

The invention is illustrated in the accompanying drawings in which.

Similar numerals refer to similar parts throughout the several views.

Figure 1:
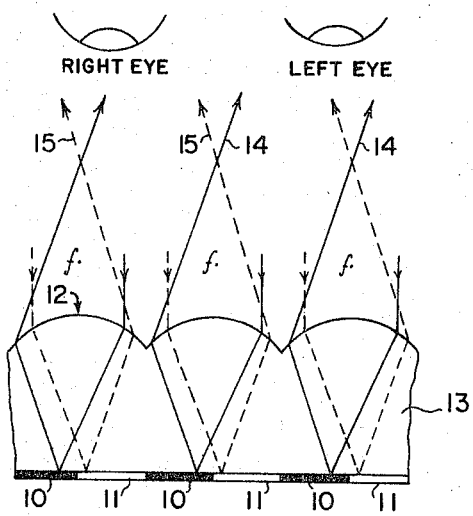
FIG. 1 is a diagrammatic cross section of the described prior art device.

The prior art which has been described hereinabove is illustrated in FIG. 1 of the drawings. This type of device or picture is well known, and all that need be said is that it comprises a picture having alternate striae 10 and 11 representing strips from left eye 10 and right eye 11 photographs. In front of an alternate pair of strips 10 and 11 is disposed a lenticular shape 12 of the facing plate 13. The disposition of the path of the light rays is shown in the figure, and line 14 shows the pattern of light rays from left eye portion of picture 10 and line 15 shows the pattern of light rays from right eye portion of picture 11. The lines 14 and 15 are intended to be representative of useful light rays coming from the picture 10, 11, and are not intended to represent all of the light rays, but merely a sufficient number of representative light rays to show how the device operates.

Figure 2:
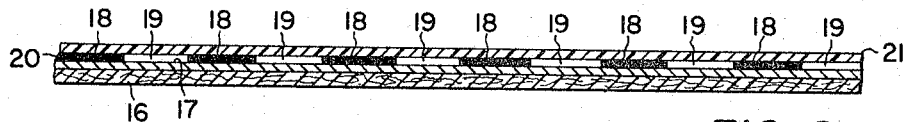
FIG. 2 is a cross section of one form of the invention in a partially prepared state.
Figure 3:
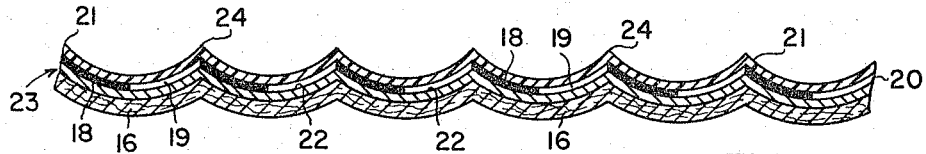
FIG. 3 is a cross section of a completed device made in accordance with the invention.

In FIG. 2 of the drawings, a partially prepared device in accordance with the invention is illustrated. First there is a backing or carrier sheet 16 which is of a conventional type such as paper, paperboard, plastic material, sheet metal or any other suitable material. Attached or bonded to carrier sheet 16 is a reflecting sheet, such as a mirror surface 17. This highly reflective sheet 17 may be in the form of a coating created by depositing a suitable metal in accordance with technically accepted methods, such as chemical or vacuum deposition, or by depositing a film former containing leaf metal particles on a carrier sheet by conventional methods, or one may choose a laminated mirroring surface such as commercially available metal foil mounted on a backing 16 of paper or paperboard. In addition, imitation metal surfaces such as fine particles of natural or synthetic mother of pearl, or a type of mica called vermiculite deposited on a carrier sheet, may be used. A polished sheet metal surface could also be used for highly reflective surface 17.

In view of the foregoing, I will use the term "metallic-like" in the claims hereinbelow to mean either a reflective metallic surface or any reflective surface having the reflective qualities of a metallic surface, whether such surface be made of metal, or natural or synthetic plastic, or a combination of metal and plastic, or a reflective layer of metal or plastic or natural materials in combination with a supporting layer.

The right eye 19 and left eye 18 striae are vertical strips made from stereoscopic right eye and left eye material such as views, or photographs, and are printed on this highly reflective surface 17 using any of the conventional printing methods. This forms a substantially transparent layer 20. The transparency is provided by using transparent printing inks. The term "substantially transparent" means that light rays are permitted to go through the layer to be reflected back from the highly reflective surface 17. Thus, the substantially transparent layer could range from clear transparent to translucent, and in some small areas to approaching opaque. Finally, the entire surface may be coated with a protective layer 21 which must be a clear transparent layer.

In the preferred form of the invention, a clear vinyl or nitrocellulose lacquer is used.

The final step is to provide for the concave, convex, or alternate concave and convex reflecting surfaces of the various forms of the invention which will give the illusion of three dimensional depth when viewing the alternate striations. These are produced with highly polished accurate stampers in an embossing process well known to the art such as plate or roller embossing. Thus, in the form of invention shown in FIG. 4 of the drawings, parallel concave mirrors 22 are pressure formed in the composite sheet or picture frame 23. The mirrors 22 will have a concave optical surface that is actually formed out of the reflecting surface 17. The mirrors 22 are arranged vertically as defined hereinabove and have peaks 24 which should register as exactly as possible with a pair of alternate left eye 18 and right eye 19 striae. Thus, there will always be two neighboring alternate right eye 19 and left eye 18 striae within one concave mirror element 22 and in front of the said mirror 22. Care must be taken during the expansion of the mirrors 22 and in their formation to compensate for the deformation of the sheet so that a neighboring pair of striae will be within the width of the chord that spans from peak 24 to peak 24 of each mirror element 22. Otherwise, the important registration of these elements between picture and mirror will be lost.

Figure 4:
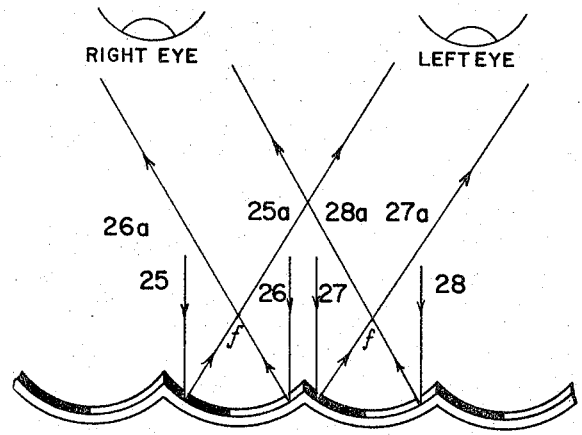
FIG. 4 is a diagrammatic representation of the manner of reflection of light rays from the alternate striae of the invention.

The concave mirrors 22 of the form of the invention as shown in FIG. 4 of the drawings are in the shape of a parabola or a circle. The depth of the mirror, in preferred form, is between 20 and 30% of the distance of the chord between the peaks of the mirrors 22. These measurements are by no means exclusive, and are given as preferred examples, and any measurement which will create the desired three dimensional illusion may be used.

In FIG. 4 of the drawings, the optical principle of the invention which obtains the same results as the prior art lenticular system is demonstrated. As mentioned before, in the conventional lenticular system, incoming light rays reflect from the right eye 11 and left eye 10 picture elements and are deflected through the focus of the lenses 12 into the eyes of the viewer. Similarly, in the device of the invention, incoming rays marked 25, 26, 27 and 28 will be deflected through the focus as rays 25a, 26a, 27a and 28a into the right eye and left eye of the viewer respectively as shown in FIG. 4. Some rays, naturally, will not be deflected into the right direction, and will be lost for the effect, but a large number will perform in the desired way and give us the three dimensional effect. For purposes of illustration only, rays parallel to the optical axis are illustrated. It becomes clear that this optical effect is similar, but not identical, with the one obtained with the conventional lenticular method. The difference in the two methods are so vast in the practical application that this invention has a great many advantages over the old lenticular method. The advantages are as follows:

(1) The device of the invention is less expensive to produce. There is no necessity for either a pre-formed plastic sheet containing the lenticular lenses nor is it necessary to flow on a plastic sheet which requires complicated and expensive machinery. Thus, the cost of these expensive procedures is eliminated and the machinery is not necessary.

(2) When the plastic lenticular system is eliminated, we eliminate the thickness of the plate as well as the weight of the plate, both of which become excessive as the picture grows larger.

(3) The device of the invention is easy to mass produce. It may be printed commercially on conventional foil for instance which may be embossed in conventional embossing machinery with the only requirement being that there be an acceptable commercial registration of the elements; and (4) A clearer picture is obtained with the device of the invention than with the lenticular system because the light beams do not have to penetrate the plastic lenses both coming and going.

In addition to providing three dimensional pictures by means of the invention, I can also provide for animated pictures by having two pictures with slightly different disposition of elements so that the illusion of movement is created as the viewer moves from side to side, or rotates the carrier sheet in front of his eyes. In addition, instead of providing for this two picture animation, one can provide for completely different pictures; for example, the name of a product and some advertising material concerning the product in alternate pictures, or a picture of the product such as a toilet soap, and then in the next picture some descriptive material about the soap.

The word "picture" or "printed picture" as used herein and in the claims hereinbelow is defined to mean a picture, design, or writing, printed by a printing press, or made by an artist, or writer, or made by a photographic process, or by any other means.

Figure 5:
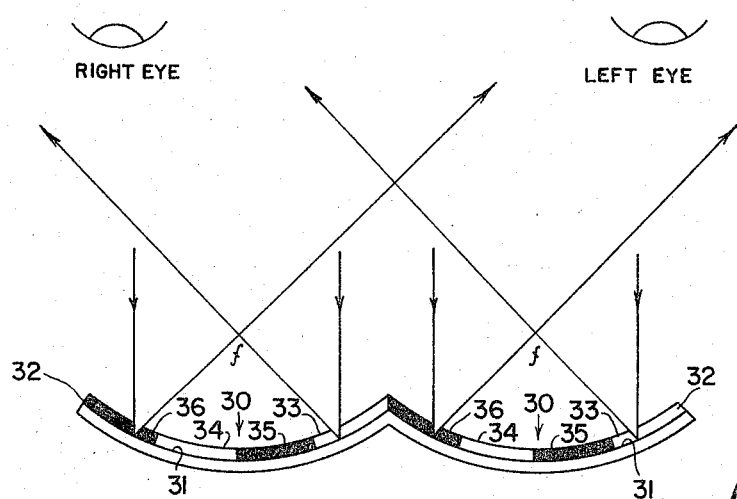
FIG. 5 is a view similar to FIG. 4 showing another form of the invention.
Figure 6:
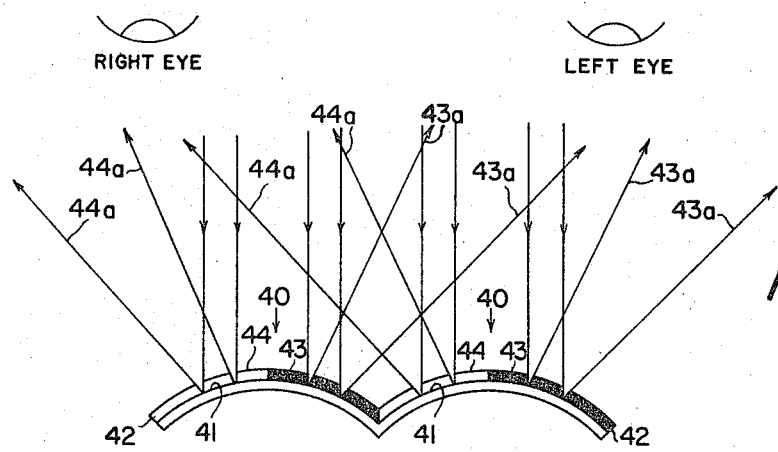
FIG. 6 is a view similar to FIG. 4 showing still another form of the invention.
Figure 7:
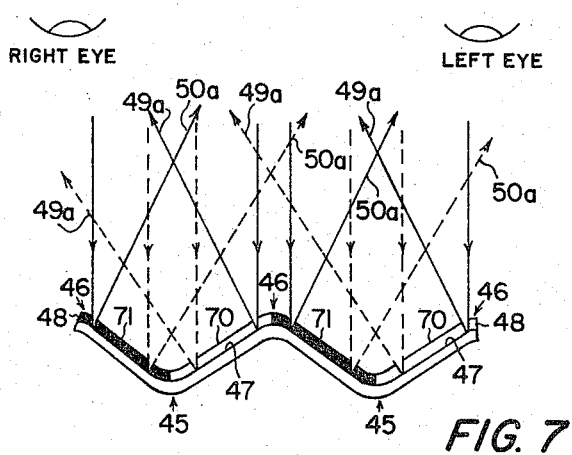
FIG. 7 is a view similar to FIG. 4 showing a further alternate form of the invention.

In FIGS. 5, 6 and 7 of the drawings, I illustrate alternate forms of the invention showing various types of vertically disposed flutings comprised either of all concave shaped flutings or convex shaped flutings, or a combination of alternately arranged concave and convex flutings. In the form of invention shown in FIG. 5 of the drawings, the flutings 30 are concave. This form of invention is almost identical to the form of invention shown in FIG. 4 of the drawings. It has a highly reflective surface 31 and a substantially transparent layer 32 comprised of alternate striations 33 and 34 for the right eye and 35 and 36 for the left eye. There is an essential difference between the form of invention shown in FIG. 5 of the drawings and the form shown in FIG. 4 of the drawings. In the form shown in FIG. 4, I show a pair of alternate striations 19 and 18 for the right and left eye respectively. In FIG. 5, I show more than one striation of the right eye and left eye views within each concave or fluted portion 30. Thus, in each of the fluted concave portions 30, we find two pairs of striations, making a total of four striations, giving two striations for each eye. Although I have found that this multiple striation form as shown in FIG. 5 produces a form of invention in which some of the striations may become less effective optically, the net result is a composite picture which may have better three-dimensional appearance.

In FIG. 6 of the drawings, I show another form of the invention in which the vertical fluitings are convex rather than concave. In this form of invention I provide convex mirrors as designated by reference numeral 40 having highly reflective surface 41, on top of which there is the substantially transparent layer 42 containing the striated material. In this form of the invention, since the mirrors are convex rather than concave, I provide the striations 43 for the left eye picture on the left of the device as it is seen by the eyes, and the striations 44 for the right eye picture on the right side of the flutings as viewed by the eyes. Thus, light rays 43a will go to the left eye and light rays 44a will go to the right eye.

In FIG. 7 of the drawings, I show another form of the invention in which the flutings are alternately concave as defined by reference numeral 45, and convex as defined by reference numeral 46. This form of invention also has a highly reflective surface 47 and the substantially transparent layer 48. Alternate right eye 70 and left eye 71 striations are provided in the substantially transparent layer 48 to produce the two stereoscopic images on the composite picture. In this form of invention, the solid ray lines in FIG. 7 show the reflection of light rays from the convex portions of the flutings, and the dotted lines show the reflections of light rays from the concave portions of the flutings. Rays designated 49a go to the right eye, and rays designated 50a go to the left eye.

It is now apparent that the flutings which I have described hereinabove define a series of small, closely spaced, alternating ridges and grooves comprising in cross section curved portions selected from either circular, parabolic, or sine curves.

In the various forms of the invention, I have shown some of the forms having only a pair of striations within each fluting, and other forms having multiple striations within each fluting. In the illustrations, I have illustrated two pairs as the multiple striations. This is by way of illustration only as there may well be three or four or even five pairs of striations within each fluting. In addition, the multiple striations may be used for either concave flutings or convex flutings, or the form of invention having the alternate concave and convex flutings, or in any form of the invention.

While I have described my invention in its preferred forms, there are other forms which it may take without departing from the spirit and scope of the invention. For example, the striae of the right and left eye pictures of the invention can be printed directly on highly polished metal sheets by metal lithographic methods in transparent ink. The highly polished metal can then be put through an embossing process to create the concave mirrors as aforesaid.

Another example would be to preform a sheet of metal or foil, with a highly reflective surface already embossed with the mirrors in place, and then deposit a transparent decal or printing directly on the preformed metal. The printing may also be done in the usual manner of offset printing or by silkscreen printing.

Another example of a sheet with a metallic-like reflective layer would be a preformed plastic sheet in fluted form in accordance with the invention carrying a highly reflective surface or mirror on the back. On the face of the sheet, I would provide a photosensitive emulsion or layer. The sheet as thus prepared would then be exposed in a camera the same as any sensitized plate with the exception that the camera for the exposure would be a special stereoscopic type of camera in which the right eye lens would expose striations of the right eye picture and the left eye lens would expose striations of the left eye picture, and the striations would be alternated in accordance with this invention. In making and exposing the negative of this example, an apparatus and method as described in U.S. Letters Patent No. 2,506,131 granted on May 2, 1960 on application of Maurice Bonnet may be used.

Another example of sheets with metallic-like surfaces would be the preparation of flexible fluted sheets out of a material with a highly reflective surface such as a parallel arrangement of thin metal wires, or filaments made of fiberglass, or synthetic resins possessing a metal-like reflectivity. These wires or filaments placed together would form the fluted or convex face necessary for the invention which, in turn, could be covered with a striated pair of pictures as in the other forms of the invention.

There may also be other forms of the invention which will become readily apparent to those skilled in the art, and I, therefore, desire to be protected for all forms coming within the claims hereinbelow.

Wherefore I claim:

1. A stereoscopic picture comprising a flexible reflective metallic-like sheet having a series of vertically running, small, closely spaced alternating ridges and grooves defining a cross section comprising curved portions selected from circular, parabolic, or sine curves, and having a printed picture applied on a surface thereof.

2. The stereoscopic picture as defined in claim 1 comprising a first view and a second view disposed in alternate striation arrangement on said vertically running ridges and grooves, with at least one respective striation of the first view and at least one respective striation of the second view positioned within each of said curved portions.

3. A stereoscopic picture as defined in claim 1, in which the picture is multi-colored.

4. A stereoscopic picture as defined in claim 1 which is comprised of said circular or parabolic curved portions in the form of convex curves.

5. The stereoscopic picture as defined in claim 1 which is comprised of said circular or parabolic curved portions in the form of concave curves.

6. The stereoscopic picture as defined in claim 1 which is comprised of said sine curved portions in the form of alternating concave and convex curves.

7. The stereoscopic picture as defined in claim 1 in which the flexible reflective metallic-like sheet is comprised of a supporting layer of material in combination with a metallic-like reflective layer.

8. A changeable picture comprising a flexible reflective metallic-like sheet having a series of parallel running, small, closely spaced alternating ridges and grooves defining a cross section comprising curved portions selected from circular, parabolic, or sine curves comprising a first printed picture and a second printed picture applied on a surface thereof disposed in alternate parallel striation arrangement on said ridges and grooves with at least one respective situation of the first picture and at least one respective striation of the second picture positioned within each of said curved portions.

9. A changeable picture as defined in claim 8, in which the picture is multi-colored.

10. A changeable picture as defined in claim 8 which is comprised of said circular or parabolic curved portions in the form of convex curves.

11. A changeable picture as defined in claim 8 which is comprised of said circular or parabolic curved portions in the form of concave curves.

12. A changeable picture as defined in claim 8 which is comprised of sine curved portions in the form of alternating concave and convex curves.

13. A changeable picture as defined in claim 8 in which the flexible reflective metallic-like sheet is comprised of a supporting layer of material in combination with a metallic-like reflective layer.

References Cited
UNITED STATES PATENTS

| | | | |
|---|---|---|---|
| 856,519 | 6/1907 | Deeks | 161—33 |
| 1,992,608 | 2/1935 | Dennison | 40—137 |
| 2,086,556 | 7/1937 | Jacobson | 350—128 |

JACOB STEINBERG, *Primary Examiner.*